United States Patent [19]

Lin et al.

[11] Patent Number: 5,485,214
[45] Date of Patent: Jan. 16, 1996

[54] DUAL BUS DUAL BANK ARCHITECTURE FOR MOTION COMPENSATION

[75] Inventors: Vincent M. S. Lin, Taipei; Foo-Ming Lee, Kaohsiung, both of Taiwan

[73] Assignee: Industrial Technology Research Institute, Hsinchu, Taiwan

[21] Appl. No.: 23,796

[22] Filed: Feb. 25, 1993

[51] Int. Cl.⁶ ................................................. H04N 7/32
[52] U.S. Cl. ........................... 348/416; 348/413; 348/699
[58] Field of Search ..................................... 348/413, 416, 348/420, 699; H04N 7/130, 7/137

[56] References Cited

U.S. PATENT DOCUMENTS

| | | |
|---|---|---|
| 4,897,720 | 1/1990 | Wu et al. . |
| 4,937,666 | 6/1990 | Yang ........................ 348/413 |
| 5,142,360 | 8/1992 | Niihara ..................... 348/699 |
| 5,200,820 | 4/1993 | Charavi .................... 348/699 |
| 5,206,723 | 4/1993 | Parke ....................... 348/420 |
| 5,210,605 | 5/1993 | Zaccarin ................... 348/699 |

FOREIGN PATENT DOCUMENTS

| | | |
|---|---|---|
| 276434 | 12/1987 | European Pat. Off. . |
| 364748 | 9/1989 | European Pat. Off. . |
| 415737 | 8/1990 | European Pat. Off. . |
| 484140 | 10/1991 | European Pat. Off. . |
| 557948 | 2/1993 | European Pat. Off. . |

OTHER PUBLICATIONS

L. De Vos et al, "VLSI Architectures for th Full–Search Blockmatching Algorithm", IEEE ICASSP, pp. 1687–1690 (1989).

T. Komarek et al., "Array Architecture for Block Matching Algorithms", IEEE, Trans. on Circ. and Systesm, vol. 36, No. 10, Oct. 1989, pp. 1301–1308.

L. De Vos et al, "Parameterizable VLSI Architecture . . . Algorithm", IEEE Trans. On Cir. and Systems, vol. 36, No. 10, Oct. 1989 pp. 1309–1316.

Kun–Min Yang et al, "A Family of VLSI Designs for the Motion Compensation . . . " IEEE Trans. on Cir. and Systems, vol. 36, No. 10, Oct. 1989, pp. 1317–1325.

*Primary Examiner*—Howard W. Britton
*Assistant Examiner*—Richard Lee
*Attorney, Agent, or Firm*—Meltzer, Lippe, Goldstein et al.

[57] ABSTRACT

A memory architecture for use in a video coder comprises two sets of memories and two buses. The memory architecture is used to increase the efficiency of use of a Motion Estimation Unit (MEU) in the video coder.

8 Claims, 5 Drawing Sheets

DUAL BUS DUAL BANK ARCHITECTURE FOR MOTION COMPENSATION

FIELD OF THE INVENTION

The present invention relates to a coder for coding a video image. More particularly, the present invention is related to an architecture which utilizes two sets of memories and two buses to increase the efficiency of use of a Motion Estimation Unit contained within the coder and to smooth the data flow in a pipelined operation of the coder.

BACKGROUND OF THE INVENTION

Figure 1:
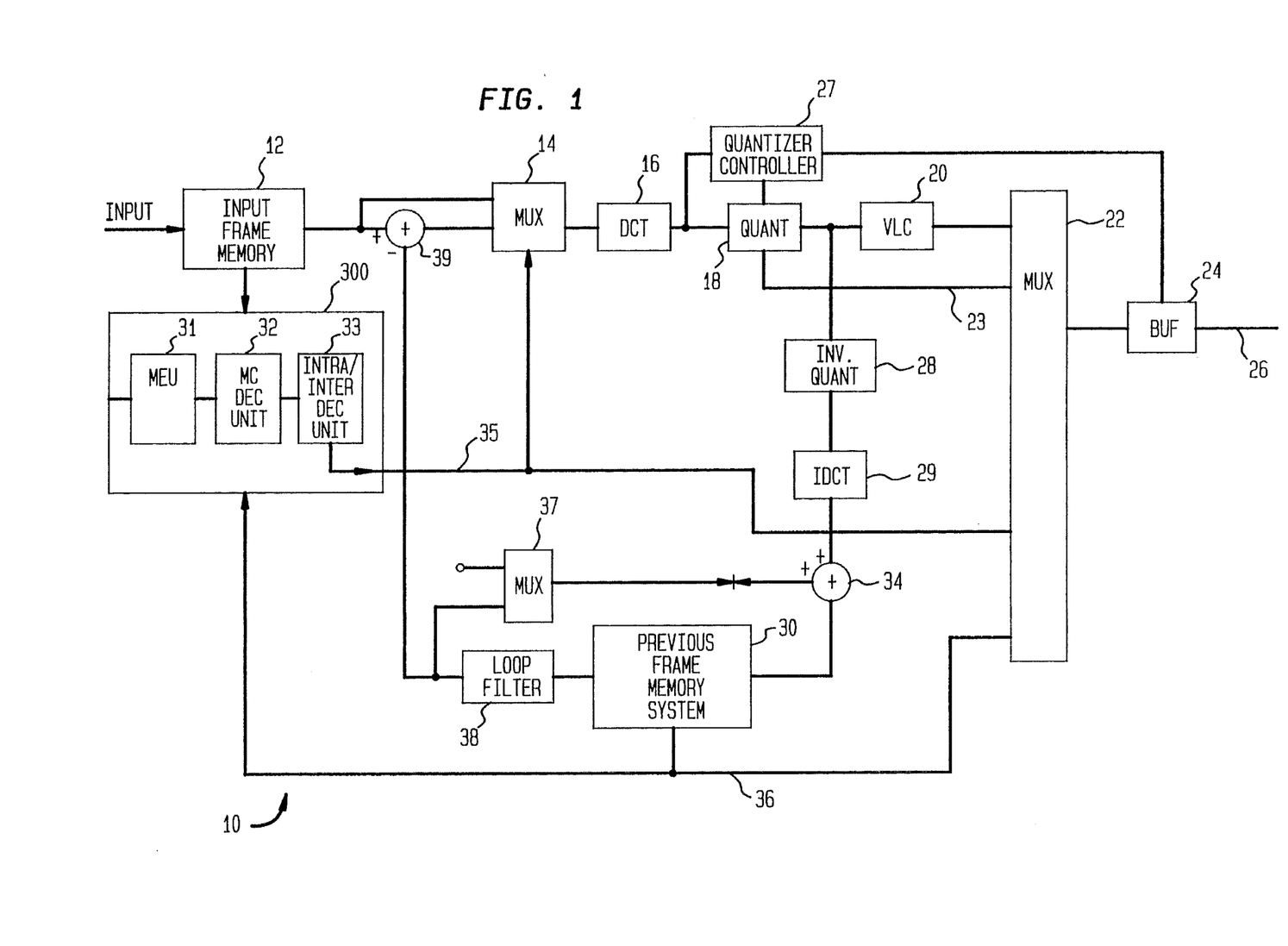
FIG. 1 schematically illustrates a video coder circuit.

A video coder is illustrated in FIG. 1. The video coder 10 operates in accordance with CCITT recommendation H.261 (See "Draft Revision of Recommendation H.261 Video Codec for Audio Visual Services at px64 Kbits/sec", Signal Processing: Image Communication 2 (1990) 221–239, Elsevier).

The video coder contains an input frame memory 12 for storing a current frame of video to be coded. The current frame of video is coded on a block-by-block basis. Some frames are coded in accordance with an intra-mode. In the intra-coding mode, no information from a previous frame is utilized and the coding relies entirely on information contained within the current frame. In the intra-mode, the current frame is divided into N×N pixel blocks, where N=16 for example. Each block of pixels is transmitted from the memory 12, via the multiplexer 14, to the Discrete Cosine Transform (DCT) circuit 16. In the DCT circuit 16, the Discrete Cosine Transform is applied to the block of pixels. The transformed pixels are then thresholded and quantized in the quantizer circuit 18. The quantized, transformed pixels are then coded using the variable length coder (VLC) 20. The variable length coded pixels are then transmitted via the multiplexer 22 to the buffer 24. The coded pixels are then transmitted from the buffer 24 via a channel 26 to a particular destination, where the pixels are decoded. Depending on the contents of the buffer 24, as well as depending on the transformed pixel values, the quantization controller 27 may vary the threshold and quantization stepsize utilized by the quantizer circuit 18. Information as to the threshold and quantization stepsize used to code a particular block is transmitted to the destination via line 23, the multiplexer 22, the buffer 24, and the channel 26.

The output of the quantizer circuit 18 is connected to the inverse quantizer circuit 28 and Inverse Discrete Cosine Transform (IDCT) circuit. 29. These two circuits serve to reconstruct a block of pixels coded according to the intra-mode. The reconstructed block of pixels is stored in a previous frame memory system 30. Thus, on a block-by-block basis, the entire current frame, in reconstructed form, is stored in the previous frame memory system 30. This insures that when the next frame is coded, the immediately previously coded frame is always available. Note that when a block of pixels is coded using the intra-mode, the multiplexer 37 outputs zero so the adder 34 adds nothing to the output of the IDCT circuit 29. Thus, the output of the IDCT circuit 29 is connected directly to the previous frame memory system 30, without change. When a frame is coded in the intra-mode, all of the blocks in that frame are coded in the manner described above.

Some frames are coded using a technique known as predictive mode coding. When a frame is coded using the predictive mode, some blocks are coded using the intra-mode described above and some blocks are coded using an inter-mode described below. The inter-mode requires information from both the previous frame and the current frame. For a frame coded using the predictive mode, a decision as to whether to use the inter or intra-mode is made on a block-by-block basis.

The first step in deciding whether to use the intra-mode or the inter-mode for a current block is to first find the best match of the current block in the previous frame. For this purpose the processor circuit 300 is used. The processor circuit 300 contains a Motion Estimation Unit (MEU) 31, a Motion Compensation (MC) Decision Unit 32, and an Inter/Intra Decision Unit 33. The current block of the current frame is transmitted from the input frame memory 12 to the MEU 31. A search window of the previous frame, which previous frame is stored in the previous frame memory system 30, is also transmitted to the MEU circuit 31. The search window of the previous frame includes the pixels of the previous frame which correspond to the pixels of the current block of the current frame as well as additional pixels in each dimension to define a search window.

For example, the search window comprises the pixels in the previous frame which correspond to the 16×16 current block as well as ±7 pixels in each dimension. The error between the 16×16 current block and each possible 16×16 block in the search window is then determined. The error between the current block at each possible 16×16 block in the search window is determined according to the formula $$\text{error} = \sum_{i,j=1}^{16} \{|a(i,j) - b(i-m, j-n)|^p\}$$

where a(i,j) is a pixel from the current block, b(i-m,j-n) is a pixel from a specific block in the search window, and D=m,n is a displacement vector of the specific block in the search window with respect to a zero displacement block in the search window. The block in the search window which results in the minimum error is then determined. The block in the search window which results in the minimum error may be the zero displacement block (D=0,0) or a block which is displaced from the zero displacement block by a motion vector D=m*,n*, where m*,n* is the value of m,n which results in the minimum error. The zero displacement block (i.e., D=0,0) in the search window is the 16×16 block which has the same location in the previous frame stored in the previous frame memory system 30 as the current block has in the current frame. If D does not equal 0,0, it means that the best match block in the search window is displaced from the zero displacement block by the motion vector m*,n*.

Figure 2:
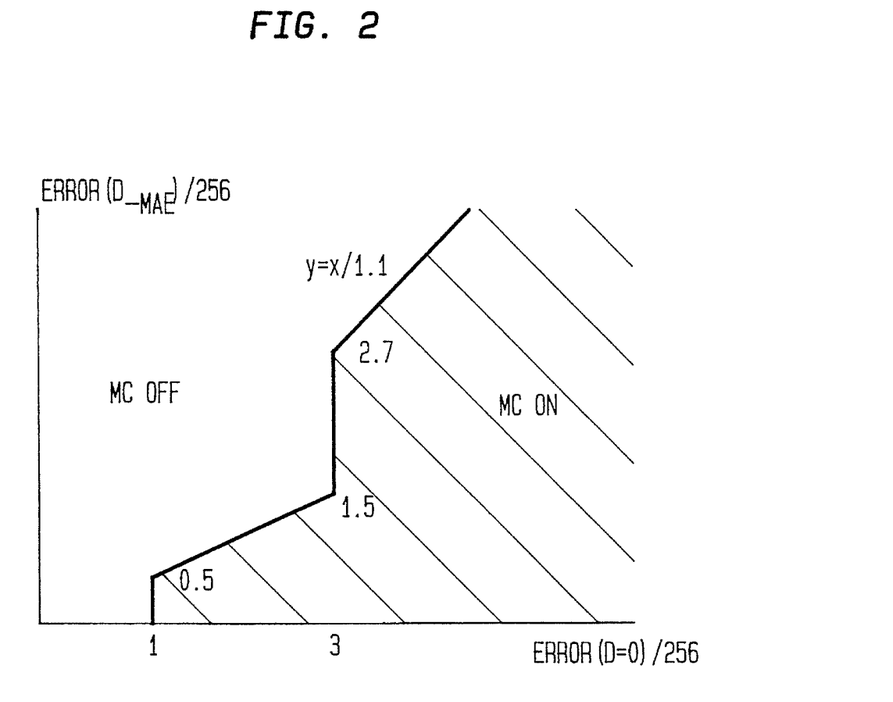
FIG. 2 is a graph for use in deciding whether or not to use motion compensation for a block of pixels.

The MC decision unit 32 determines whether or not to use motion compensation for each current block in the current frame. The algorithm used to make the decision may be understood with help of FIG. 2. In FIG. 2, the vertical axis represents possible values of the error between the current block and the block in the search window which results in the minimum error. The horizontal axis represents possible values of the error between the current block and the D=0,0 block in the search window. The actual errors between the current block and the best match and zero displacement blocks of the search window define a point in the graph of FIG. 2. If this point is in the shaded region of FIG. 2 (excluding the decision curve) motion is detected and motion compensation is used for the current block. If the point is outside the shaded region, motion compensation is not used for the current block.

Once it is decided whether or not to use motion compensation for a current block, the Inter/Intra Decision Unit 33 decides whether to use intra-mode or inter-mode coding for the current block. If motion compensation is to be used, then the best match (i.e., minimum error) block of the search window is used for the inter/intra decision. If motion compensation is not used for the current block, then the inter/intra decision is made using the zero displacement block of the search window.

The inter/intra decision is as follows: the variance of the current block and the variance of the error between the current block and the best match or zero displacement block (depending on whether or not there is Motion Compensation) are determined. The variance (VAROR) of the current block is given by $$VAROR = INT \left\{ \frac{sum\ |a(i,j)|^2}{N^2} - \frac{(sum\ a(i,j))^2}{N^2} \right\}$$

In addition, the variance of the error between current and best match block or zero displacement block is given by $$VAR = INT \left\{ \frac{sum\ |a(i,j) - b(i,j)|^2}{N^2} \right\}$$

Figure 3:
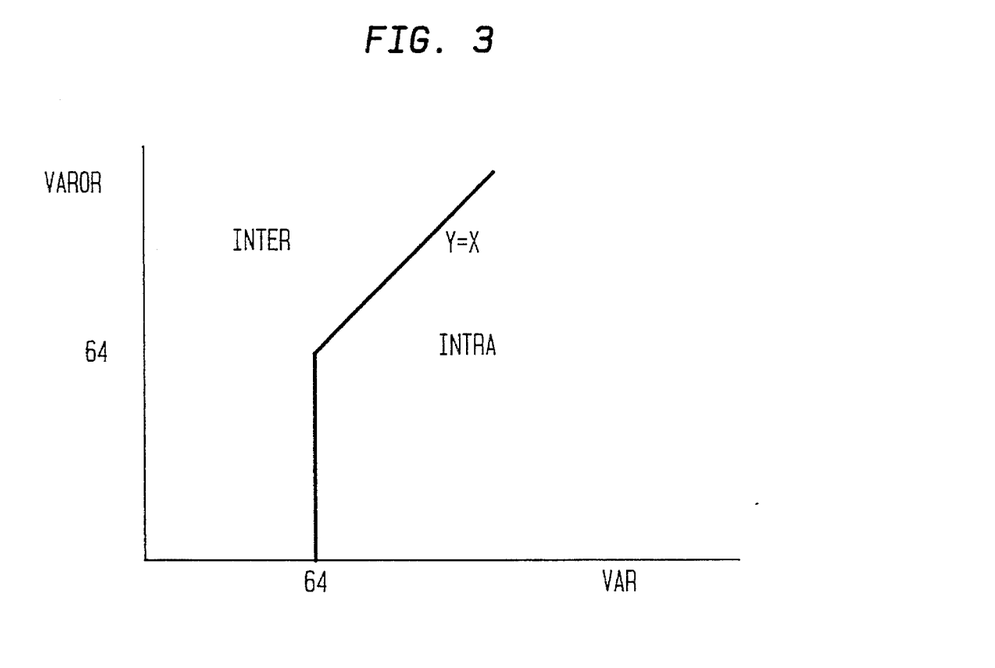
FIG. 3 is a graph for use in deciding whether to use inter or intra mode coding for a block of pixels.

Depending on the value of VAROR and VAR, inter or intra mode coding is utilized in accordance with FIG. 3.

The decision as to whether to use inter or intra coding is transmitted from the MC circuit to the multiplexer 12 via line 35.

When intra-mode coding for the current block is used, the current block is transmitted from the frame memory 12, via the multiplexer 14, to the DCT circuit 16 and the block is coded directly using the DCT circuit 16, the quantizer 18, and the VLC circuit 20 in the manner discussed above. The inverse quantizer 28 and IDCT circuit 29 are used to reconstruct the block for storage in the previous frame memory 30.

When the inter-mode is used, the best match or zero displacement block (depending on whether or not Motion Compensation is used) from the previous frame is retrieved from the previous frame memory system 30 and is filtered by the loop filter 38, which filter performs a smoothing function. The subtractor 39 is then used to obtain the difference between the current block and best match or zero displacement block from the previous frame. The difference is then transmitted from the subtractor 39, via the multiplexer 14, to the DCT circuit 16. The difference is transformed using the DCT circuit 16. The resulting transform coefficients are then thresholded and quantized using the quantizer circuit 18. The resulting coefficients are coded using the VLC 20 and transmitted via the multiplexer 22, the buffer 24, and the channel 26 to a destination.

The difference is reconstructed using the inverse quantizer 28 and IDCT circuit 29.

When inter-mode coding is used, the output of the filter 38 is transmitted via the multiplexer 37 to the adder 34.

The adder 34 combines the reconstructed difference at the output of the IDCT circuit 29 with the output of the filter 38 to reconstruct the current block. The current block is then stored in the previous frame memory system 30.

There is also transmitted to the destination via line 35, multiplexer 22, buffer 24, and channel 26 an indication of whether inter or intra-mode coding is being used for a block. This indication is also transmitted to the multiplexer 14 so that the multiplexer can determine whether to transmit to the DCT circuit 16, the circuit block from the input frame memory 12 or the difference from the subtractor 39. In addition, there is transmitted to the destination, via line 36, the multiplexer 22, the buffer 24 and the channel 26, the best match displacement vector when motion compensation is being used or an indication that the zero displacement block from the search window is being used.

In a typical application, one frame is entirely intra-mode coded and the alternate frame is coded using a predictive mode in the manner described above.

The use of motion compensation in the video coder has a number of significant advantages. Based on persistence of vision, a television signal has to be scanned at a speed of 30 frames/sec. However, in many applications, such as video conferencing there is a large amount of redundancy between frames. The use of motion compensation in the manner described above, reduces this redundancy and allows the video signal to be highly compressed. A variety of different algorithms can be used to estimate the motion between a block of pixels of the current frame and the previous frame which is stored in the previous frame memory 30 of FIG. 1. For example, a pixel recursive algorithm is disclosed in A. N. Netravali et al., "Motion Compensation Television Coding: Part I", BSTT, Vol. 58, pp. 631–670, March, 1979; and, K. A. Probhu et al., "Pel Recursive Motion Compensated Color Codecs", Proc ICC 82, p. 2G. 8.1–8.5, Philadelphia, Pa., June 1982). A block matching algorithm is disclosed in J. R. Jain et al., "Displacement Measurement and Its Application in Interframe Image Coding", IEEE Trans. on Comm., Vol. COM-29, p. 1799–1808, December 1981.

All of these algorithms require the retrieval of pixels of the previous frame from a previous frame memory (e.g., previous frame memory 30 of FIG. 1) and pixels from the current frame from a current frame memory (e.g., input frame memory 12 of FIG. 1). In order to code a video signal in real time (e.g., 15 or 30 frames per second) these frame memories must be accessed at high speed. The currently available Video RAMs (VRAMs) which meet the speed requirement are few in number and also very expensive.

Accordingly, it is an object of the present invention to provide a memory architecture for use in a video coder which enables motion compensation to operate in real time and which also reduces the cost of the frame memories used in the video coder. It is a further object of the invention to provide memory architecture in the video coder which permits block matching algorithms to use data in different pixel blocks repeatedly at different times.

SUMMARY OF THE INVENTION

The present invention is a memory architecture for use in a video coder. The memory architecture contains first and second memories. Each memory has capacity to store a current block from a current frame and a corresponding search window from a previous frame. The memory architecture of the present invention is utilized when the video coder is operating in the predictive mode.

The memory architecture operates in cycles. During the $i^{th}$ cycle, the $i^{th}$ block from the current frame and the corresponding search window from the previous frame are stored in the first memory. During the $i^{th}$ cycle, the $i^{th}$ block of the current frame and the corresponding search window are repeatedly accessed and processed by the motion estimation unit. At the start of the $i^{th}$ cycle, the $(i-1)^{th}$ block of the current frame and the corresponding search window from the previous frame are stored in the second memory. (These were written into the second memory during the $(i-1)^{th}$ cycle). During a first portion of the $i^{th}$ cycle, the $(i-1)^{th}$ current block and the best match or zero displacement block of the corresponding search window (as indicated by the motion estimation unit and motion compensation decision unit) are outputted to the inter/intra decision unit and/or the DCT loop in the video coder. During a second portion of the $i^{th}$ cycle, the $(i+1)^{th}$ current block and the corresponding search window of the previous frame are written into the second memory.

During the $(i+1)^{th}$ cycle of the memory architecture, the motion estimation unit repeatedly accesses and processes the $(i+1)^{th}$ current block of the current frame and corresponding search window of the previous frame which are now stored in the second memory. During a first portion of the $(i+1)^{th}$ cycle, the $i^{th}$ current block and zero displacement or best match block from the corresponding search window are outputted from the first memory to the inter/intra decision circuit and/or DCT loop of the video coder. During a second portion of the $(i+1)^{th}$ cycle, the $(i+2)^{th}$ current block and corresponding search window are written into the first memory.

In a preferred embodiment of the present invention, dual buses are utilized to move pixel data into and out of the first and second memories, i.e., a first bus transports current block pixel data into and out of the first and second memories and a second bus transports search window pixel data into and out of the first and second memories.

DETAILED DESCRIPTION OF THE INVENTION

Figure 4:
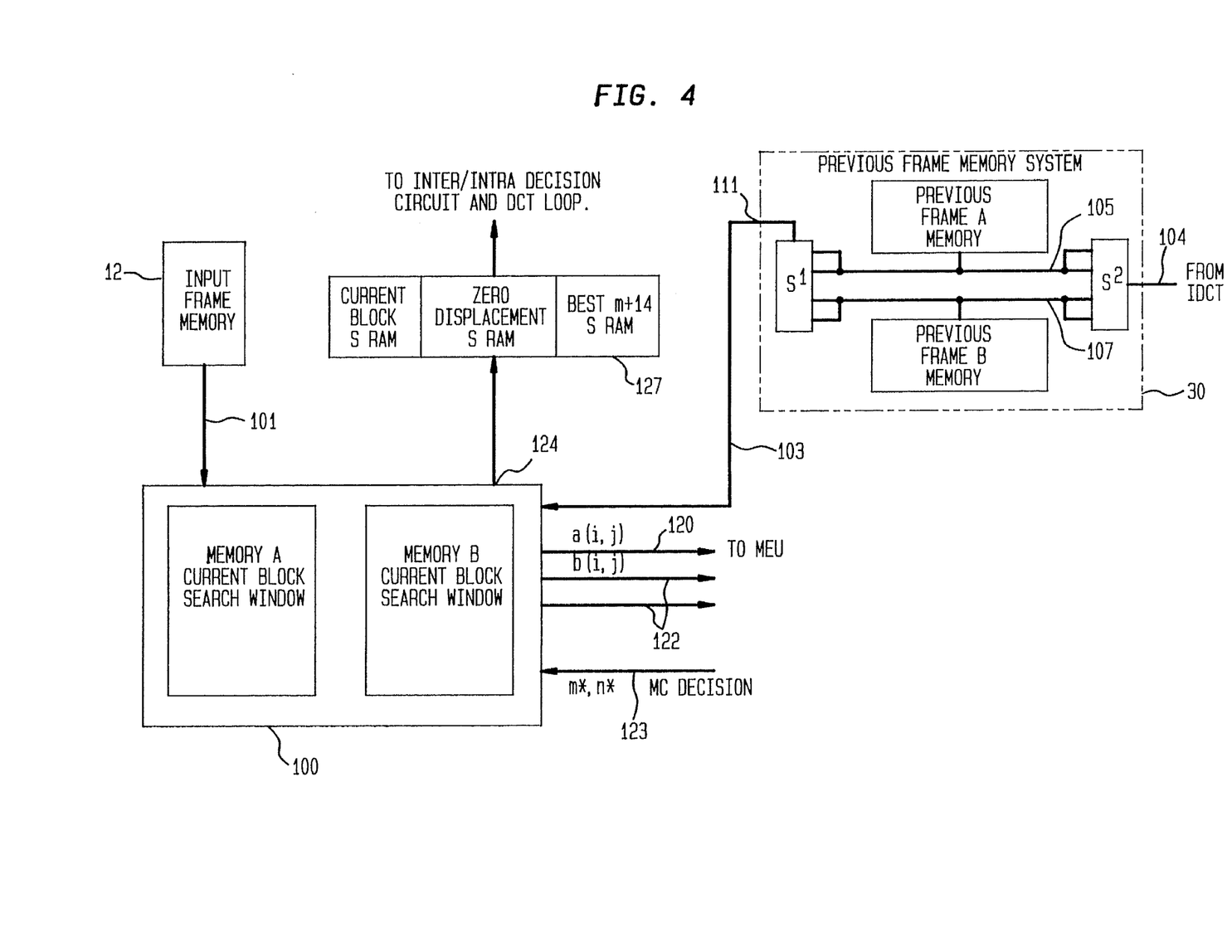
FIG. 4 shows how the memory architecture of the present invention interconnects with the video coder circuit of FIG. 1.

The inventive memory architecture 100 is schematically illustrated in FIG. 4. FIG. 4 also shows the interconnection between the memory architecture 100 and the video coder 10 of FIG. 1. As indicated above, the memory architecture is utilized when the video coder 10 codes in the predictive mode.

As shown in FIG. 4, the memory architecture 100 comprises two memories, labeled Memory A and Memory B. Memory A and Memory B each have sufficient capacity to store one block of pixels from the current frame and a corresponding search window from the previous frame.

A block of pixels from the current frame is transmitted to the memory architecture 100 from the input frame memory 12 via connection path 101. The corresponding search window of the previous frame is transmitted to the memory architecture 100 from the previous frame memory system 30 via a connection path 103.

The memory architecture 100 includes an output 120 for transmitting pixels a(i,j) of a current block to the Motion Estimation Unit 31 of FIG. 1 and also one or more outputs 122 for transmitting pixels b(i-m,j-n) of a corresponding search window of the previous frame to the MEU 31 (For example, the MEU of U.S. Pat. No. 4,897,720 receives the pixels of the search window via two inputs). The memory architecture 100 receives back from the MEU 31, via the input 123, a best match displacement vector m*,n* and/or an MC decision indicator signal which indicates whether or not Motion Compensation will be utilized in the coding of the current block.

The memory architecture 100 reads out via the output 124, a current block and either the best match or zero displacement block from the search window (depending on whether or not motion compensation is used). These pixel blocks are buffered in the SRAMs 127 before being transmitted to the intra/inter decision unit 33 (see FIG. 1) and/or the DCT coding loop of the video coder.

The previous frame memory system 30 is also shown in greater detail in FIG. 4. As shown in FIG. 4, the previous frame memory system 30 comprises two frame memories labeled Previous Frame Memory A and Previous Frame Memory B. The previous frame memory system 30 also comprises a first bus 105 and a second bus 107 and two switches S1 and S2. The Previous Frame Memory A and the Previous Frame Memory B operate as follows. In a first position of the switches S1 and S2, reconstructed blocks of the current frame are transmitted from IDCT circuit 29, via input 109, switch S2, and bus 105 into Previous Frame Memory A. Search window pixels of the previous frame are transmitted from Previous Frame Memory B via bus 107, switch S1, output 111, and connection path 103 to the memory architecture 100. After the current frame, in reconstructed form, is completely stored in Previous Frame memory A, the switches S1 and S2 change position, so that for the next frame, search windows are read out of Previous Frame Memory A and reconstructed pixel blocks are written into Previous Frame Memory B.

Figure 5:
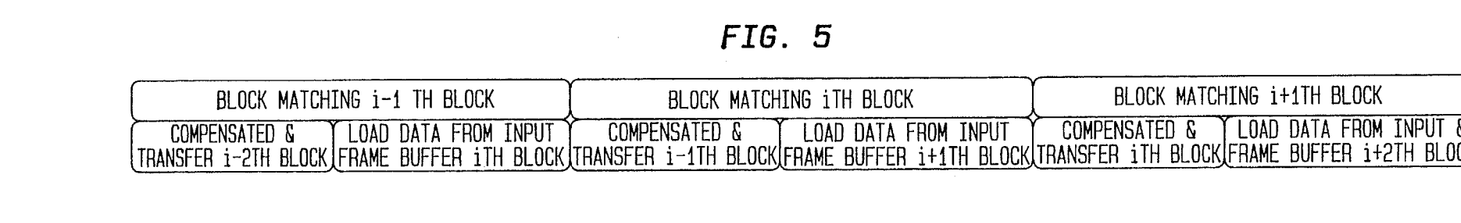
FIG. 5 is a timing diagram for the memory architecture of the present invention.

The operation of the memory architecture 100 may be understood in greater detail with the help of the timing diagram of FIG. 5. The operation of the memory architecture 100 takes place in cycles. An example of the operation is as follows.

At the start of $(i-1)^{th}$ cycle, the $(i-1)^{th}$ current block of the current frame and the corresponding search window of the previous frame are stored in the Memory A and the $(i-2)^{th}$ current block and corresponding search window are stored in the Memory B. Pixels of the $(i-1)^{th}$ current block and the corresponding search window are accessed on an "as needed basis" from the Memory A via the outputs 120, 122. This enables the MEU to perform the motion estimation function. The MEU returns D=m*,n* and an MC decision to the memory architecture 100 for the $(i-1)^{th}$ current block via the input 123. During a first portion of $(i-1)^{th}$ cycle, the $(i-2)^{th}$ current block of the current frame and a best match or zero displacement block from the corresponding search window are read out of the Memory B via the output 124. During a second portion of the $(i-1)^{th}$ cycle, the $i^{th}$ block of the current frame and the corresponding search window from the previous frame are transferred from the input frame memory 12 and previous frame memory system 30, respectively, into the Memory B.

During the $i^{th}$ cycle, pixels of the $i^{th}$ block of the current frame and the corresponding search window of the previous frame are accessed as needed from the Memory B by the MEU via the outputs 120, 122. The MEU performs its motion estimation and detection operation and the motion vector m*,n* and MC decision are returned from the MEU to the memory architecture 100 via the input 123. During a first portion of the $i^{th}$ cycle, the $(i-1)^{th}$ current block and the best match or zero displacement block from the search window are read out from the Memory A, and transmitted via the output 124 to the appropriate SRAM 127. In the second half of the $i^{th}$ cycle, the $(i+1)^{th}$ block from the current frame is transmitted from the input frame buffer 12 into the Memory A and the corresponding search window is transmitted from the previous frame memory system 30 into the Memory A.

Operation then continues into the $(i+1)^{th}$ cycle, wherein block matching takes place in the MEU for the $(i+1)^{th}$ block now stored in the Memory A, the $i^{th}$ block is transmitted out of Memory B along with the best match or zero displacement block from the search window, and the $(i+2)^{th}$ current block and corresponding search window are written into the Memory B.

Figure 6:
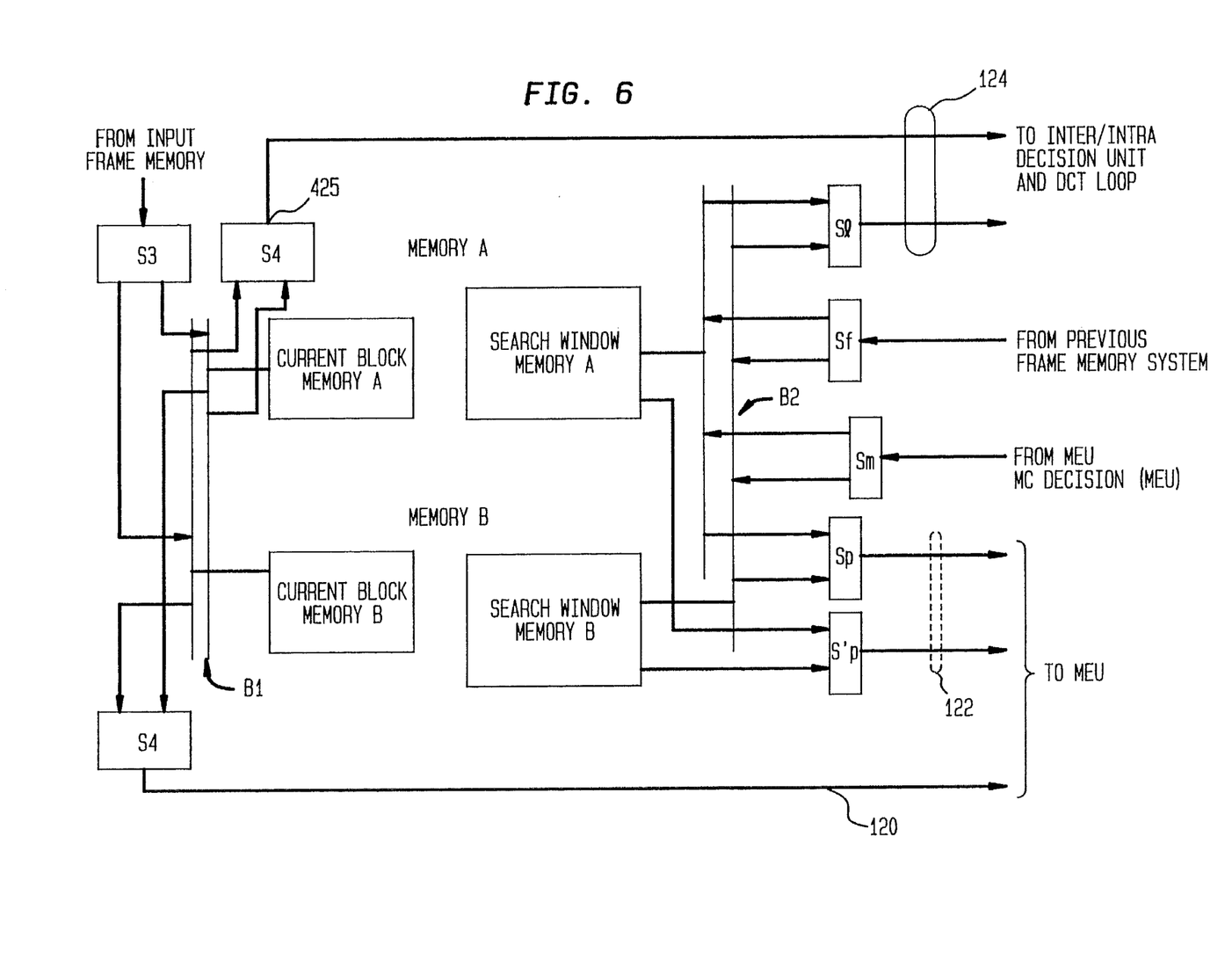
FIG. 6 is a detailed circuit implementation of the memory architecture of the present invention.

A detailed implementation of the memory architecture 100 is shown in FIG. 6. As shown in FIG. 6, the memory architecture 100 comprises a Memory A and a Memory B. The Memory A comprises a current Block Memory A for a current block and a Search Window Memory A for a corresponding search window. The Memory B comprises a current block Memory B for a current block and a Search Window Memory B for a corresponding search window.

The memory architecture 100 also comprises two buses B1 and B2. Associated with the bus B1 are three switches S3, S4 and $\overline{S4}$.

The switch S3 has a left state (input connected to left output) and a right state (input connected to right output). The switch S4 has a left state (left input connected to the output) and a right state (right input connected to the output). The switch $\overline{S4}$ also has a left state and a right state. Depending on the state of switch S3 pixel data is transferred from the input frame memory to Current Block Memory A or B. Depending on the state of switch $\overline{S4}$, pixel data is transferred from the current Block Memory A or B to the MEU via output 120. Depending on the state of switch S4, pixel data is transferred from Current Block Memory A or Current Block Memory B via the output 124 to the Inter/Intra Decision Unit and/or DCT filter loop.

The switch Sf is associated with the bus B2. The switch Sf has an upstate (input connected to upper output) and a down state (input connected to the lower output). Depending on the state of switch Sf, search window pixel data from the previous frame memory system 30 is transmitted into Search Window Memory A or Search Window Memory B.

Associated with the bus B2 are the switches Sp and Sp'. These switches can have an upstate (upper input connected to the output) or a downstate flower input connected to the output). Depending on the state of Sp and Sp', pixel data is transferred from Search Window Memory A or B via outputs 122 to the MEU.

The switch Sl is also associated with the bus B2. The switch Sl has an upstate (upper input connected to the output) and a downstate (lower input connected to the output). Depending on the state of Sl, pixel data from Search Window Memory A or B is transmitted via output 124 to the Inter/Intra Decision Unit and/or the DCT loop.

As indicted above, the memory architecture 100 operates cyclically. The switches described above operate as follows in one cycle of the cyclical operation.

(1) Assume the $i^{th}$ current block and its corresponding search window have been stored in Current Block Memory A and Search Window Memory A, respectively. The switches Sp and Sp' are placed in the upper state and the switch S4 is placed in the right state so that data needed for motion estimation is accessible by the MEU.

(2) The $(i-1)^{th}$ current block and corresponding search window have been previously stored in the Current Block Memory B and the Search Window Memory B, respectively. In order to transfer the $(i-1)^{th}$ current block from Current Block Memory B and the best match or zero displacement block from the search window stored in Search Window Memory B, $\overline{S4}$ is placed in the left state (opposite to the state of S4) and Sl is placed in the down state.

(3) After step two is completed, S3 is placed in the left state and the switch Sf is placed in the downstate so that the $(i+1)^{th}$ current block can be stored in the Current Block Memory B and corresponding search window can be stored in Search Window Memory B.

In the next cycle, the process is the same except that the switches are reversed because pixel data from Memory B is transferred to the MEU and pixel data from Memory A is transferred to the outputs 124 and the next current block and corresponding search window is then written into Memory A.

As shown in FIG. 6, it should be noted that the memory 100 architecture may include an additional switch Sm associated with the bus B2. This switch transmits from the MEU and MC decision circuit an indication of the displacement vector, D=m*,n*, and an indication as to whether or not Motion Compensation will be used for the current block to either Search Window Memory A or Search Window Memory B depending on whether the switch Sm is in the upstate (input connected to upper output) or downstate (input connected to lower output). This permits either the best match or zero displacement block of the current search window (depending on whether or not Motion Compensation is used) to be transferred to the output 124.

In short, there has been disclosed a memory architecture which comprises two sets of memories and two buses. The memory architecture is used to increase the efficiency of a Motion Estimation Unit in a video coder. Finally, the above-described embodiments of the invention are intended to be illustrative only. Numerous alternative embodiments may be devised by those skilled in the art without departing from the scope of the following claims.

We claim:

1. A video coder comprising
   an input frame memory storing a current video frame to be coded,
   a coding circuit for coding the current video frame stored in said input frame memory utilizing motion estimation and compensation,
   a previous frame memory for storing a previous frame coded by said coding circuit,
   a memory architecture comprising a plurality of current block memories and a plurality of search window memories including one search window memory corresponding to each of said current block memories,
   a first bus for enabling said coding circuit in an $i^{th}$ cycle of a sequence of cycles to access an $i^{th}$ current block of pixels from a first one of said current block memories for motion estimation and compensation, for transmitting an $(i-1)^{th}$ current block of pixels from a second one of said current block memories to said coding circuit for coding, and for transmitting an $(i+1)^{th}$ current block of pixels from said input frame memory to said second one of said current block memories, a second bus for enabling said coding circuit in the $i^{th}$ cycle to access search window pixels from one of said search window memories corresponding to said first one of said current block memories for motion estimation and compensation of said $i^{th}$ current block, for transmitting a best match or zero displacement block of pixels from a second one of said search window memories corresponding to said second one of said current block memories to said coding circuit for the coding of said $(i-1)^{th}$ current block, and for transmitting a search window of pixels corresponding to said $(i+1)^{th}$ current block from said previous frame memory to said second one of said search window memories.

2. The video coder of claim 1 wherein said coding circuit comprises an inter/intra mode decision circuit, a discrete cosine transform circuit, a quantizer circuit, and a variable length coder for coding said $(i-1)^{th}$ current block.

3. The video coder of claim 2 wherein said coding circuit includes a motion estimation unit and motion compensation decision unit for estimating and compensating for motion in said $i^{th}$ current block.

4. In a video coder, a memory architecture comprising a first memory including a first current block memory and a first search window memory for selectively storing a current block of pixels of a current video frame to be coded and a search window of pixels of a previous video frame, respectively, a second memory including a second current block memory and a second search window memory for selectively storing a current block of pixels of a current video frame to be coded and a search window of pixels of a previous video frame, respectively, a first bus for selectively connecting said first current block memory and said second current block memory to an input frame memory of said video coder, a motion estimation unit of said video coder, and an inter/intra mode decision unit of said video coder, and a second bus for selectively connecting said first search window memory and said second search window memory to a previous frame memory of said video coder and a decision circuit of said video coder.

5. The memory architecture of claim 4 wherein in one cycle of said memory architecture said first current block memory and said first search window memory are connected to said motion estimation unit, in a first part of said one cycle said second current block memory and said second search window memory are connected to said decision circuit, and in a second part of said one cycle said second current block memory is connected to said input frame memory and said second search window memory is connected to said previous frame memory.

6. The memory architecture of claim 5 wherein in another cycle following said one cycle, said second current block memory and said second search window memory are connected to said motion estimation unit, in a first part of said another cycle said first current block memory and said first search window memory are connected to said decision circuit, and in a second part of said another cycle said first current block memory is connected to said input frame memory and said first search window memory is connected to said previous frame memory.

7. A method for operating a video coding circuit including a memory architecture comprising a plurality of current block memories and a plurality of search window memories including one search window memory corresponding to each of said current block memories, said method comprising the steps of:

in an $i^{th}$ cycle of a sequence of cycles, performing motion estimation on an $i^{th}$ current block of pixels of a current frame of video by accessing for use by a motion estimation unit of said video coding circuit said $i^{th}$ current block of pixels stored in a first one of said current block memories and a search window of pixels stored in a first corresponding one of said search window memories, in a first part of said $i^{th}$ cycle, transmitting an $(i-1)^{th}$ current block of pixels from a second one of said current block memories to said video coding circuit and transmitting from a second one of said search window memories corresponding to said second one of said current block memories a best match or zero displacement block of pixels to said video coding circuit for coding said $(i-1)^{th}$ current block of pixels, and in a second part of the $i^{th}$ cycle, transmitting an $(i+1)^{th}$ current block of pixels from an input frame memory of the video coding circuit to said second one of said current block memories, and transmitting from a previous frame memory of said video coding circuit a search window corresponding to the $(i+1)^{th}$ current block to said second one of said search window memories.

8. The method of claim 7 wherein said step of coding the $(i-1)^{th}$ current block comprises using said $(i-1)^{th}$ current block of pixels and the best match or zero displacement block of pixels from a previous frame stored in a previous frame memory of said video coding circuit to make an inter/intra mode determination for the $(i-1)^{th}$ current block of pixels.

* * * * *